United States Patent
Pellerin

(10) Patent No.: US 11,480,071 B2
(45) Date of Patent: Oct. 25, 2022

(54) BALANCING RING GEOMETRY

(71) Applicant: PRATT & WHITNEY CANADA CORP., Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 17 days.

(21) Appl. No.: 16/889,839

(22) Filed: Jun. 2, 2020

(65) Prior Publication Data
US 2021/0372296 A1    Dec. 2, 2021

(51) Int. Cl.
F01D 25/16    (2006.01)
F01D 25/04    (2006.01)
F01D 25/06    (2006.01)

(52) U.S. Cl.
CPC .......... F01D 25/164 (2013.01); F01D 25/04 (2013.01); F01D 25/06 (2013.01)

(58) Field of Classification Search
CPC ...... F01D 25/164; F01D 25/16; F01D 25/162; F01D 25/04; F01D 25/06; F01D 5/027
See application file for complete search history.

(56) References Cited

U.S. PATENT DOCUMENTS

| | | | |
|---|---|---|---|
| 3,964,342 A | | 6/1976 | Beam, Jr. et al. |
| 4,130,399 A | * | 12/1978 | Hallerback ............. B25B 27/20 29/225 |
| 4,220,055 A | * | 9/1980 | Dubois .................... F16F 15/34 464/180 |
| 4,776,763 A | * | 10/1988 | Light ..................... F01D 5/027 416/144 |
| 7,334,980 B2 | * | 2/2008 | Trinks ................... F01D 25/246 415/1 |
| 7,661,928 B2 | * | 2/2010 | Bart ....................... F16C 35/067 415/232 |
| 7,775,723 B2 | * | 8/2010 | Maffre .................... F01D 25/16 384/537 |
| 7,912,587 B2 | | 3/2011 | Walters et al. |

(Continued)

FOREIGN PATENT DOCUMENTS

EP    1817227    12/2012

OTHER PUBLICATIONS

Extended European Search Report, EP21174807.4, dated Nov. 2, 2021.

*Primary Examiner* — Brian P Wolcott
*Assistant Examiner* — Joshua R Beebe
(74) *Attorney, Agent, or Firm* — Norton Rose Fulbright Canada LLP

(57) ABSTRACT

An annular parts assembly for mounting onto a shaft of an aircraft engine is provided. The assembly comprises a first annular body having a surface defining a plurality of pulling features extending from a remainder of the surface, the pulling features circumferentially spaced apart on the surface. The assembly comprises a second annular body defining a balancing ring, the balancing ring concentric with the first annular body, the balancing ring having a plurality of protrusions and circumferential spaces between adjacent ones of the plurality of protrusions, the circumferential spaces accommodating the pulling features such that the pulling features of the first annular body and the protrusions intercalate.

18 Claims, 5 Drawing Sheets

(56) References Cited

U.S. PATENT DOCUMENTS

| | | | | |
|---|---|---|---|---|
| 8,579,538 B2* | 11/2013 | Juh | ................ | F16D 1/0876 |
| | | | | 403/359.5 |
| 8,888,458 B2* | 11/2014 | Billings | ................ | F04D 29/662 |
| | | | | 416/144 |
| 9,920,626 B2* | 3/2018 | Casaliggi | ............... | F04D 29/662 |
| 9,989,083 B2 | 6/2018 | Labbe | | |
| 10,392,953 B2 | 8/2019 | Miller et al. | | |
| 2002/0134191 A1* | 9/2002 | Czerniak | ................ | F01D 5/027 |
| | | | | 416/145 |
| 2005/0244272 A1 | 11/2005 | Bruno et al. | | |
| 2011/0081253 A1* | 4/2011 | Lecuyer | ................ | F01D 5/027 |
| | | | | 416/96 R |
| 2017/0370224 A1 | 12/2017 | Porter et al. | | |

* cited by examiner

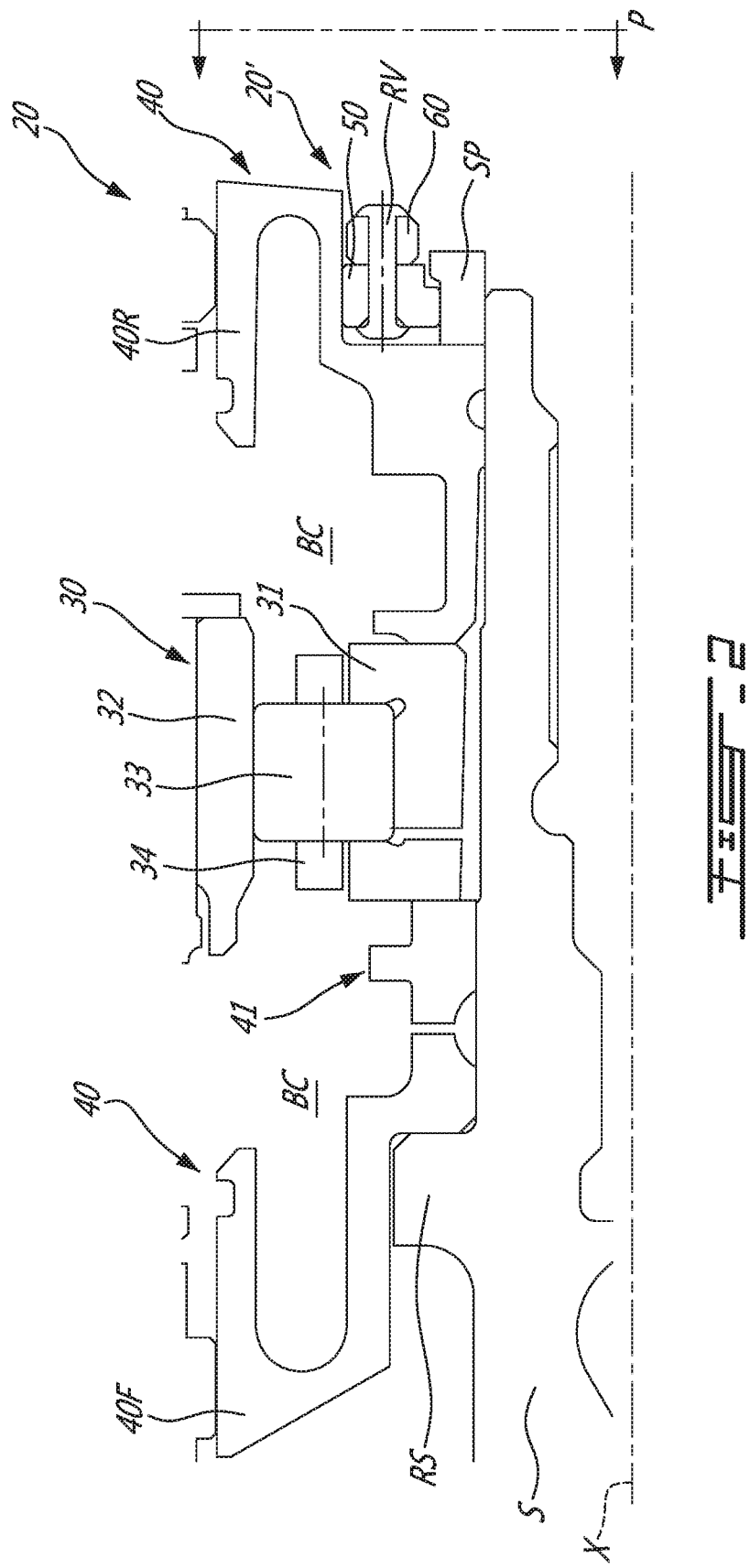

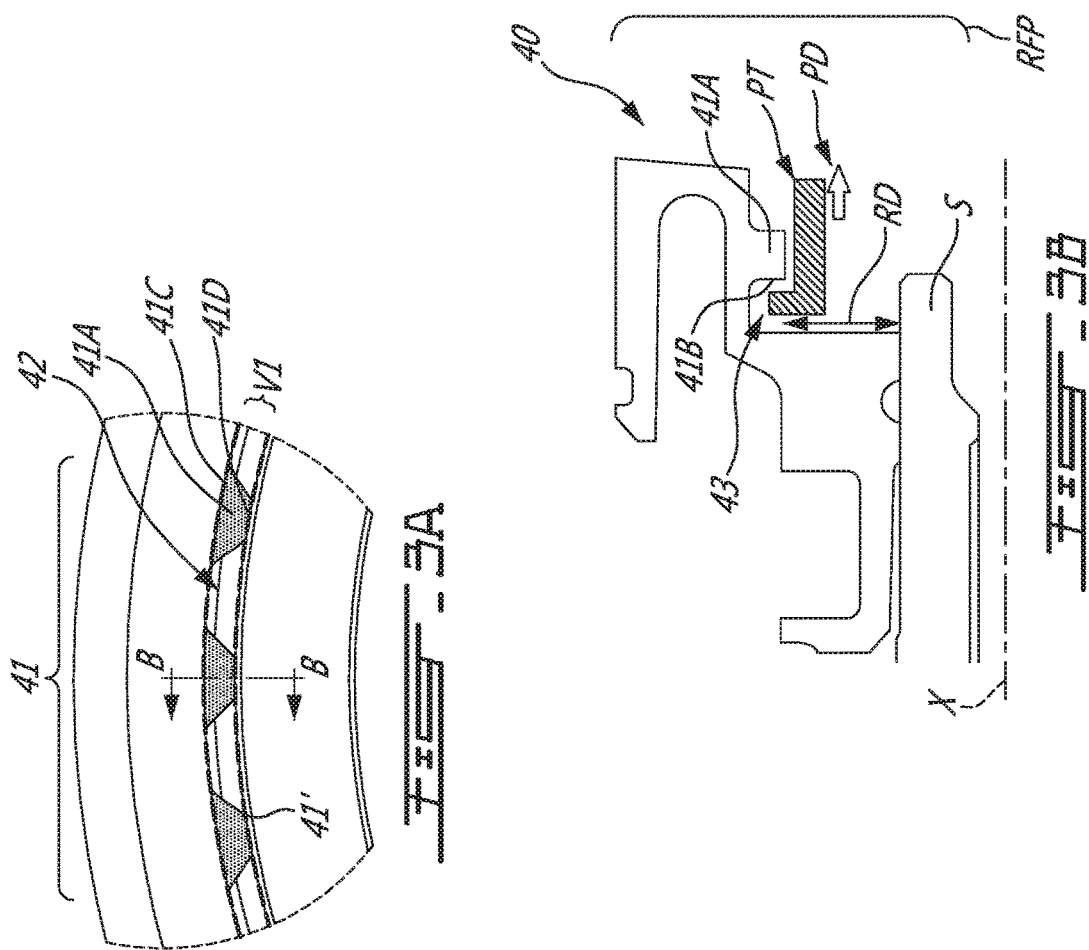
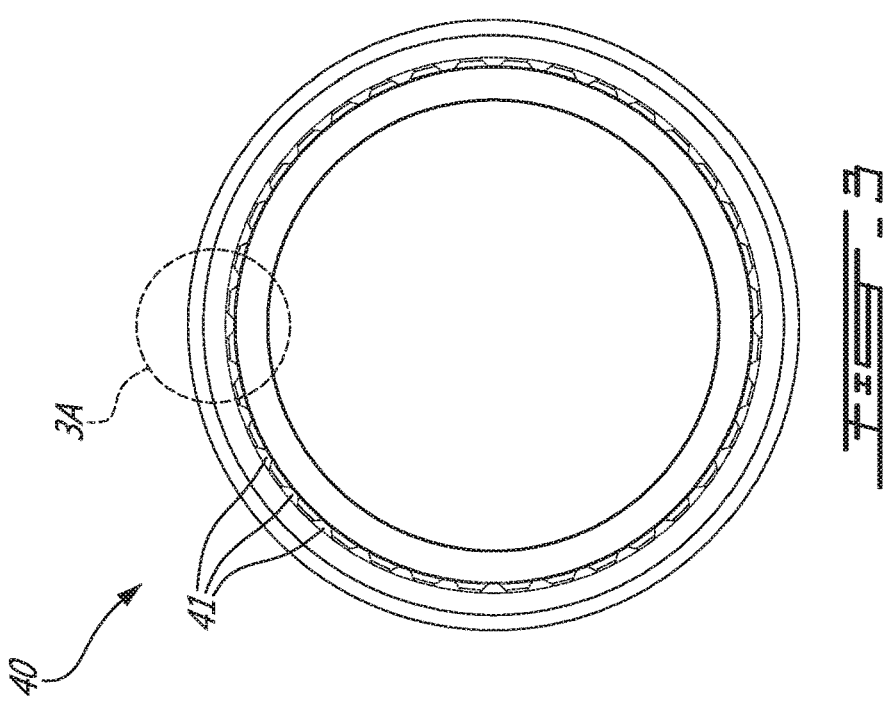

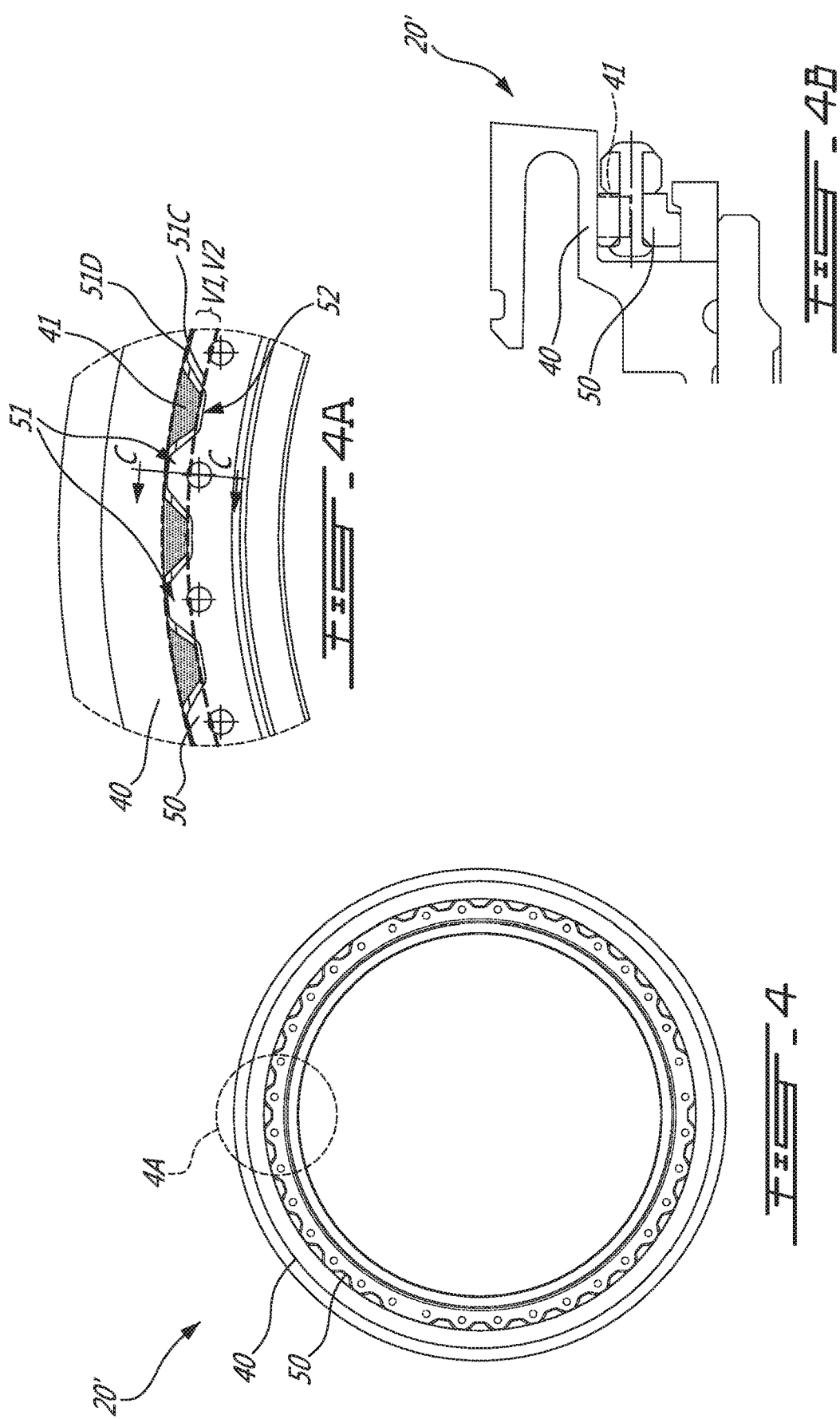

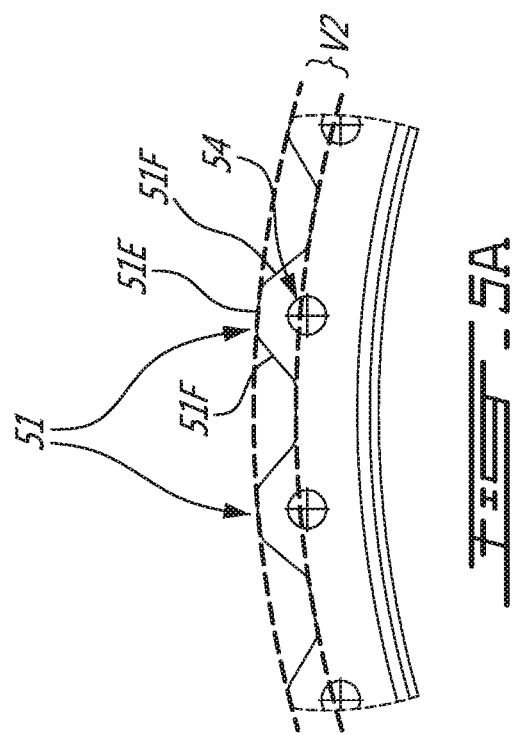
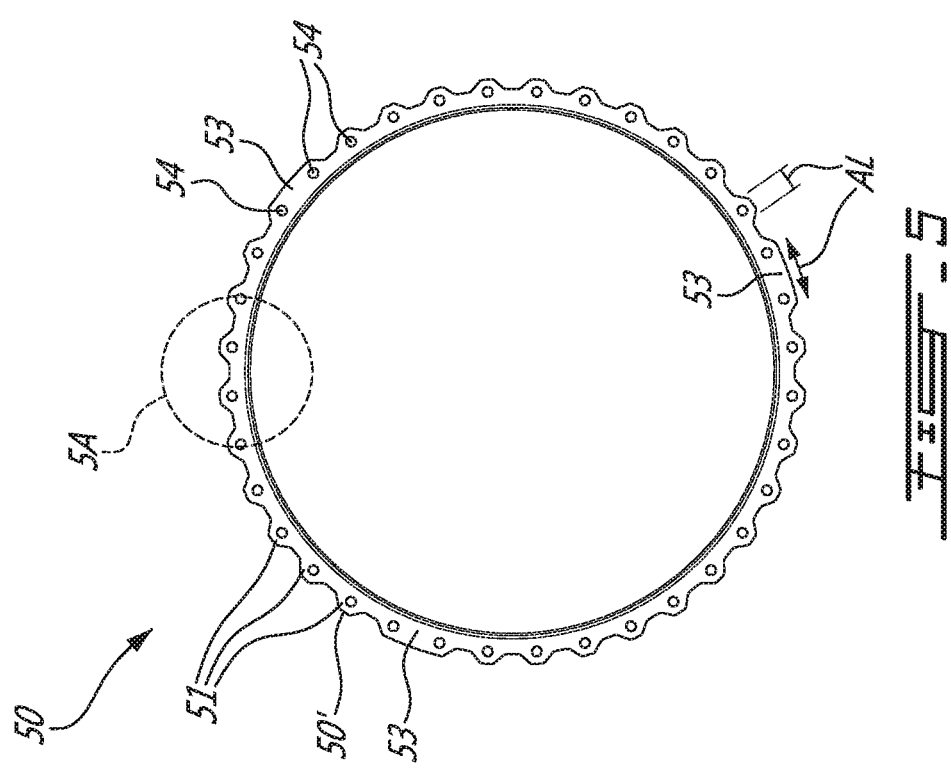

BALANCING RING GEOMETRY

TECHNICAL FIELD

The application relates generally to aircraft engines and, more particularly, to rotor balancing assemblies for aircraft engines.

BACKGROUND OF THE ART

Aircraft engines of various types have rotor assemblies or part subassemblies that include components mounted for rotation about an axis. For instance, aircraft engines often have components coupled together for mutual interaction and/or supporting or interconnecting other components of the engines. These complex assemblies may require proper balancing to limit rotational vibrations during operation of the engines. Balancing of such assemblies and sub-assemblies with suitable balancing components to do so within a limited space of the engine volume envelope may be tedious.

SUMMARY

In one aspect, there is provided a rotary parts assembly for an aircraft engine comprising: an annular body configured to be removably secured to a shaft of the aircraft engine, the annular body having a plurality of pulling features disposed circumferentially therealong; and a balancing ring configured to be removably mounted to the shaft, the balancing ring being concentric with the annular body, the balancing ring having a periphery and portions along said periphery that intercalate with the plurality of pulling features.

In another aspect, there is provided an assembly for mounting onto a shaft of an aircraft engine, the assembly comprising: a balancing ring having a peripheral surface defining a plurality of adjacent protrusions along said peripheral surface, circumferential spaces defined between said protrusions, the balancing ring defining a first annular volume envelope corresponding to a volume of the protrusions and the circumferential spaces of the balancing ring; and an annular body having a portion radially aligned with the balancing ring, the annular part having a peripheral surface defining a plurality of adjacent tabs along said peripheral surface, circumferential spaces defined between said tabs, the annular part defining a second annular volume envelope corresponding to a volume of the tabs and the circumferential spaces of the annular part, the balancing ring and the annular part mounted relative to each other such that at least part of the first and second annular volume envelopes overlap.

In a further aspect, there is provided an annular parts assembly for mounting onto a shaft of an aircraft engine, the assembly comprising: a first annular body having a surface defining a plurality of pulling features extending from a remainder of the surface, the pulling features circumferentially spaced apart on the surface; and a second annular body defining a balancing ring, the balancing ring concentric with the first annular body, the balancing ring having a plurality of protrusions and circumferential spaces between adjacent ones of the plurality of protrusions, the circumferential spaces accommodating the pulling features such that the pulling features of the first annular body and the protrusions intercalate.

DESCRIPTION OF THE DRAWINGS

Reference is now made to the accompanying figures in which:

FIG. 2 is a schematic cross-sectional partial view of a rotary part assembly of an aircraft engine such as shown in FIG. 1, according to an embodiment;

FIG. 3 is a schematic front view of an annular body of the rotary part assembly, taken in plane P of FIG. 2, according to an embodiment;

FIG. 3A is a magnified schematic view of a portion of the annular body of FIG. 3;

FIG. 3B is a schematic cross-sectional partial view taken in plane B-B of FIG. 3A;

FIG. 4 is a schematic front view of a balancing ring and annular body assembly, taken in plane P-P of FIG. 2, according to an embodiment;

FIG. 4A is a magnified schematic view of a portion of the balancing ring and annular body assembly of FIG. 4;

FIG. 4B is a schematic cross-sectional partial view taken in plane C-C of FIG. 4A;

FIG. 5 is schematic front view of the balancing ring of the balancing ring and annular body assembly of FIG. 4; and FIG. 5A is a magnified schematic view of a portion of the balancing ring of FIG. 5.

DETAILED DESCRIPTION

Figure 1:
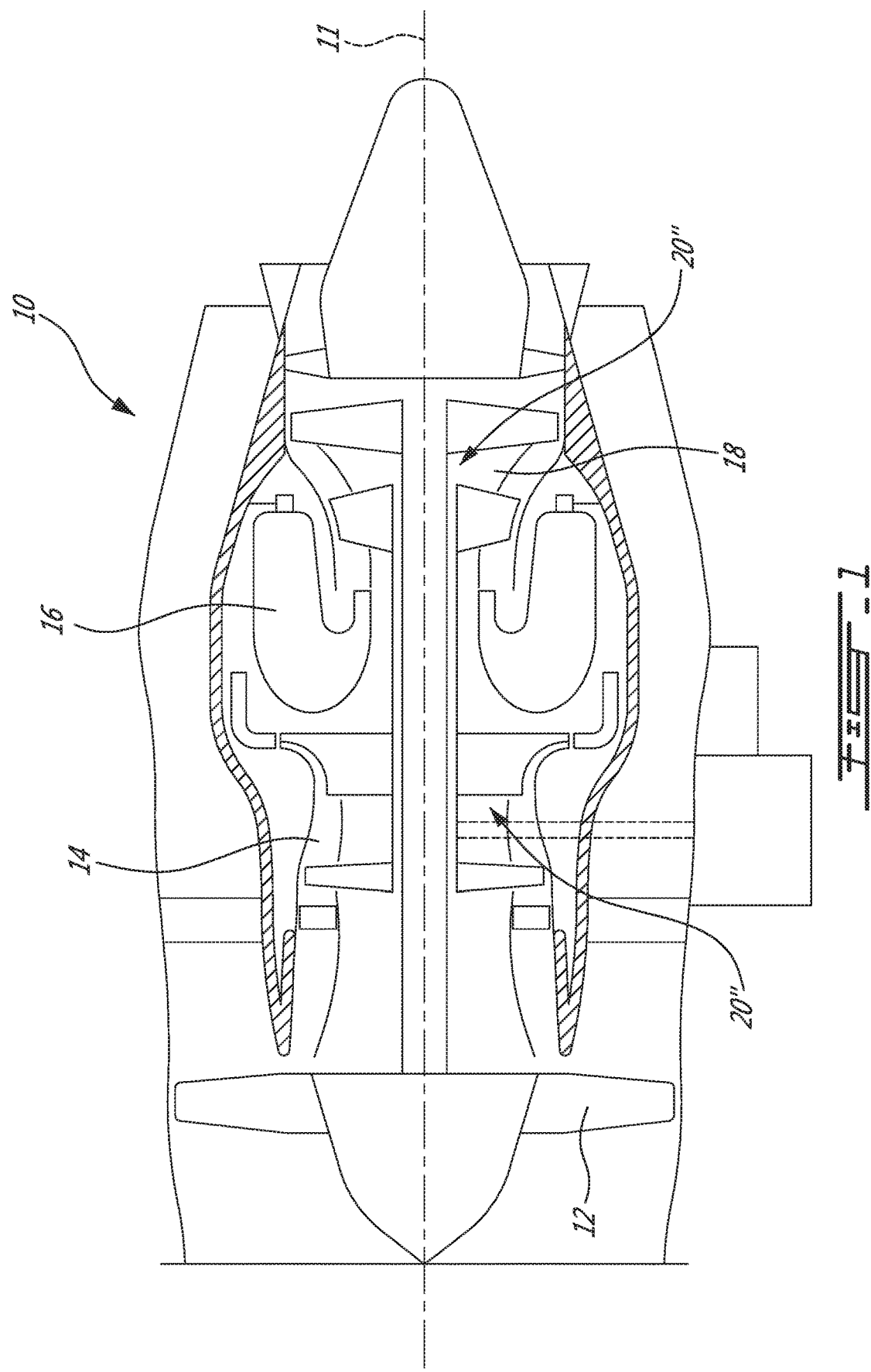
FIG. 1 is a schematic cross-sectional view of an aircraft engine, according to an embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A central longitudinal axis 11 of the engine 10 is also shown. While FIG. 1 shows a gas turbine engine 10, the subject of the present disclosure may form part of other types of aircraft engines or power plants, such as turboprop engines, internal combustion engines (e.g. rotary engines), or a combination of engines (or "engine units"), which may include electric motors, such as in hybrid power plants for aircrafts.

Aircraft engines, such as the gas turbine engine 10 of FIG. 1, generally include one or more shafts or rotary parts mounted for rotation about a rotational axis, such as axis 11 or other rotational axes. In some embodiments, such shaft(s) may form part of rotor(s) of the aircraft engine. For instance the gas turbine engine 10 of FIG. 1 includes rotor(s) 20" in the compressor section 14 and/or the turbine section 18. One or more rotating shaft(s) form part(s) of the rotors 20". The rotors 20" are supported into the engine 10 using rotor mountings allowing rotational and/or axial movement, with two distinct shafts shown in FIG. 1. For instance, the compressor section 14 and the turbine section 18 may each have a single shaft or multiple independent shafts sections in parallel or in series, rotating dependently or independently, depending on the types of turbine engine, and mounted to the gas turbine engine 10 in many suitable ways.

Shafts or other rotary parts mounted for rotation about a rotational axis in an aircraft engine may be mounted within the engine via bearing(s). Rotary parts imbalance may desirably be avoided or limited. Imbalance of rotary parts assemblies may be due to manufacturing capabilities, tolerances, or variabilities, for instance. Assemblies of rotary parts may thus require balancing to reduce and/or limit such imbalance. Referring to FIG. 2, a rotary part assembly 20, which may be part of a rotor 20" of an aircraft engine, which may be the engine 10 of FIG. 1, is shown. The rotary part assembly 20 includes a number of components mounted to each other for common rotation about a rotation axis. One or more of these components is configured to balance the rotary part assembly 20, as will be discussed later.

In the depicted embodiment, the rotary part assembly 20 includes a bearing 30 stacked axially between annular bodies 40 along a shaft S. As shown, the bearing 30 includes an inner ring 31 and an outer ring 32 radially spaced apart from each other and rolling elements 33 (e.g. rollers, balls), with a cross-section of one rolling element 33 shown in FIG. 2, rotatably mounted between the inner ring 31 and the outer ring 32. A roller cage 34 may be disposed between the inner ring 31 and the outer ring 32 and engaging the roller elements 33 to limit axial movement of the rolling elements 33 with respect to the inner and outer rings 31, 32. Other configurations of bearings may be contemplated in other embodiments, such as journal bearings, as one possibility.

The shaft S, which may be one of the engine shafts 19 shown in FIG. 1, is mounted for rotation about axis X via at least the bearing 30. In some cases, axis X may correspond to the central longitudinal axis 11 of the engine 10. The shaft S and the rotary part assembly 20 may thus rotate and, as discussed above, balancing of the rotary part assembly 20 may be desirable to limit and/or compensate for rotary motion imbalance. The rotary part assembly 20 includes an annular parts assembly 20' adapted for connection on the shaft S. The assembly 20' includes one of the annular bodies 40 and a balancing ring 50. The assembly 20' may also be referred to as a balancing ring and annular part (part or body) assembly. As shown, the annular body 40 and the balancing ring 50 are mounted concentrically with respect to each other. Counterweights 60 may be secured to the balancing ring 50, such as by riveting, or by other fasteners such as bolts, screws, etc. See for example rivet RV that fastens the counterweight 60 to the balancing ring 50 at FIG. 2. In an embodiment, the balancing is achieved by the balancing ring 50 without such counterweights, or with one or more counterweights 60.

The balancing ring 50 is mounted about the shaft S via a spacer SP that interfaces with the shaft S and the balancing ring 50. As shown, the balancing ring 50 and the spacer SP are concentric and are both connected to the shaft S. In other embodiments, the balancing ring 50 may be in direct contact with the shaft S, i.e. without the intermediary spacer SP. Limited space within the engine may require compactness of the assembly 20'. A number of parts have to fit within a limited space inside the engine. This may be due to the tendency to design more compact engines. Accordingly, radial compactness of rotary part assemblies, or sub-assemblies, such as the rotary parts assembly 20' may be desirable. The annular body 40 and the balancing ring 50 may be shaped to limit the radial footprint of the assembly 20' once installed in the engine. As will be described later, portions of the annular body 40 and the balancing ring 50 are adapted to intercalate such as to save radial space within a given volume envelope. The geometry of the balancing ring 50 is adapted to interact with the one of the annular bodies 40, as will be discussed later.

The geometry of the annular bodies 40 may vary depending on the embodiments. In the depicted embodiment, the annular bodies 40 form part of a seal runner assembly. The annular bodies 40 are front and rear runners 40F, 40R of such seal runner assembly. The front and rear runners 40F, 40R are named with respect to their relative position along the axis X in the engine orientation. As shown, the front and rear runners 40F, 40R define walls of the bearing cavity BC. The front runner 40F and the rear runner 40R are disposed on opposite sides of the bearing 30, along the axis X.

As shown, the front and rear runners 40F, 40R may limit axial movement of the bearing 30 relative to the shaft S. Front runner 40F is mounted in axial abutment with a radial stopper RS of the shaft S. The radial stopper RS may be a radial wall integral with the shaft S or a separate component secured to the shaft S. The front runner 40F is shown in direct axial contact with the radial stopper RS. Intermediary parts between the radial stopper RS and front runner 40F may be contemplated in other embodiments. In some embodiments, the front runner 40F is mounted in a tight fit relationship with the shaft S to block the axial position of the front runner 40F with respect to the shaft S. The rear runner 40R abuts axially against the bearing 30, in this case its inner ring 31. There may be an intermediary part between the rear runner 40R and the inner ring 31 of the bearing 30 in other embodiments. In some embodiments, the rear runner 40R is mounted in a tight fit relationship with the shaft S.

As shown, the front and rear runners 40F, 40R form walls of a bearing cavity BC. As shown, the bearing 30 is disposed in the bearing cavity BC. The bearing cavity BC may contain lubricant for cooling and/or lubricating purposes. As shown, at least the rotating elements 33 of the bearing 30 are in fluid communication with the lubricant of the bearing cavity BC. The bearing cavity BC is sealed to limit leakage of lubricant outside the bearing cavity BC. Although the bearing cavity BC defines a sealed cavity enclosing the bearing 30, lubricant may be channeled through one or more canals defined through walls of components surrounding the bearing cavity BC.

During assembly, the front and rear runners 40F, 40R may be heated to thermally expand. The front and rear runners 40F, 40R may be mounted about the shaft S while being in a heated state, such that when cooled down, the front and rear runners 40F, 40R may be tight fitted on the shaft S. To facilitate disassembly of the front and/or rear runners 40F, 40R from the shaft S, for instance for maintenance or for replacement of parts on the shaft S (e.g. replacement of bearing 30), the front runner 40F and/or rear runner 40R have pulling features 41. Such pulling features 41 may have different configurations, which will be discussed with reference to some embodiments and the following figures.

Referring to FIGS. 3, 3A and 3B, an annular body 40 having a plurality of pulling features 41 is shown. The annular body 40 has a surface 41' defining the pulling features 41. Such annular body 40 may be one of the front or rear runners 40F, 40R discussed above. In the depicted embodiment, the annular body 40 of FIGS. 3, 3A and 3B is the rear runner 40R. The surface 41' defining the pulling features is a radially inwardly facing surface, in this case. Such surface 41' may be a radially outwardly facing surface, such as for the pulling feature 41 on the front runner 40F, shown in FIG. 2. During disassembly of the annular body 40 from the shaft S, for instance when the annular body 40 is mounted tight fit on the shaft S, a pulling tool PT may be used to engage one or more of the pulling features 41 to pull axially the annular body 40 relative to the shaft S to translate the annular body 40 out of axial engagement with the shaft S. This is illustrated in FIG. 3B with the pulling tool PT and pulling direction PD. It is to be understood that the pulling tool PT is schematic and may have various shapes and configurations, so long as it is adapted to apply a force onto the one or more pulling features 41 to translate the annular body 40 out of engagement with the shaft S. It is also to be understood that in some cases, it may be more suitable to push the annular body 40 for disengagement from the shaft S, depending on the geometries of the parts assembly 20', for instance. The tool for removing the annular body 40 would be adapted accordingly.

As shown in FIG. 3 and the magnified view at FIG. 3A, the pulling features 41 define a plurality of radially extending tabs 41A. Tabs are one expression among others to describe such features, with other expressions including teeth, protrusions, crenellations. In an embodiment, the tabs 41A are in a crenellated pattern. The plurality of tabs 41A are disposed circumferentially along the annular body 40. Circumferential spaces 42 are defined between adjacent tabs 41A (see FIG. 3A). In the depicted embodiment, the tabs 41A are extending radially inwardly, as viewed in the radial plane P. In other embodiments, the tabs 41A may extend radially outwardly. For instance, the annular body 40, such as for the front runner 40F of FIG. 2 may have pulling features 41 extending radially outwardly. As such, in some embodiments, the rear runner 40R may have the pulling features 41 configured similarly as the front runner 40F, as another possibility.

As illustrated in FIG. 3A, the annular body 40 may define an annular volume envelope V1. The volume envelope V1 corresponds to the volume occupied by the tabs 41A and circumferential spaces 42. In the plane P, as shown, the volume envelope V1 may define an annular band between an arc tangent to a base 41C of the tabs 41A and an arc tangent to a radial extremity 41D of the tabs 41A. When viewed in FIG. 3B, the volume envelope V1 extends in the axial direction. The pulling features 41 may thus be within the volume defined by said volume envelope V1. Similarly, as discussed later, the balancing ring 50 may also define an annular volume envelope. As will be shown in other figures discussed later, at least part of these respective annular volume envelopes of the pulling features and balancing ring 50 may overlap.

The tabs 41A may have different shapes or be identical, depending on the embodiments. For instance, one or more of the tabs 41A may be shaped differently than others. In the depicted embodiment, the tabs 41A have a trapezoidal shape. The tabs 41A have a top surface extending between opposite chamfered surfaces when viewed in plane P (see FIG. 3B). As shown, the space 42 has the same cross-sectional shape as that of the adjacent tabs 41A. This may be different in other embodiments. In FIG. 3A, the tabs 41A are spaced circumferentially and equally with respect to each other. Depending on the embodiments, only some of the tabs 41A or all of them along the circumference of the annular body 40 may be spaced circumferentially and equally with respect to each other. The geometry of the tabs 41A and spaces 42 may be different in other embodiments.

FIG. 3B shows a cross-section of the annular body 40 along plane B-B of FIG. 3A. The view of the annular body 40 shown in FIG. 3A is taken along a different cross-sectional plane than in FIG. 2 and the balancing ring 50 is absent for a clearer view. As shown, the pulling feature 41, here shown as the tab 41A, defines a pulling face 41B for axial engagement with the pulling tool PT. In the depicted embodiment, the pulling face 41B extends radially inwardly. The pulling face 41B may be substantially flat, as shown. The pulling face 41B may be shaped differently, for instance defining a concavity. In some embodiments, the pulling face 41B may extend at least partially in an axial direction (e.g. along the pulling direction PD). For instance, the pulling face 41B may extend obliquely with respect to axis X. An axial space 43 is defined between the pulling face 41B and an oppositely facing wall of the annular body 40. Such space 43 may be sized to allow access to the pulling face 41B with the pulling tool PT.

It may be desirable to reduce a radial distance RD between the pulling feature 41 and the shaft S radially underneath the pulling feature 41. Limiting such radial distance may facilitate disengagement of the tight fitted annular body 40 from the shaft S, without (or with limited) deformation of the annular body 40 due to the pulling force exerted thereon. The radial distance RD may be from 20% to 90% of the radial foot print RFP. In a particular embodiment, such radial distance RD is no more than 50%±10% of the radial foot print RFP of the annular body 40. This may help maintaining a limited distance between the tight fit interface and the axial pulling force, which in turn may help limit deformation of the annular body 40 during pull.

As mentioned above, portions of the annular body 40 and the balancing ring 50 are adapted to intercalate within a given volume envelope. Referring to FIG. 4 and the magnified view of FIG. 4A, the annular body 40 and the balancing 50 are shown in an assembled state. The annular body 40 and the balancing ring 50 are disposed concentrically with respect to each other. The axial position of the balancing ring 50 relative to the annular body 40 is such that the pulling features 41 and the balancing ring 50 are radially aligned (see FIG. 4B). In other words, at least a portion of the pulling features 41 and a portion of the balancing ring 50 coincide in a common radial plane. Such radial plane may be referred to as a balancing plane of the assembly 20', named with reference to the position of the balancing ring 50 within the rotary part assembly 20, or within the subassembly 20'.

As shown, portions of the pulling features 41 intercalate with portions of the balancing ring 50. In the depicted embodiment, and referred to with respect to additional figures later, the balancing ring 50 has a periphery 50', and portions along said periphery 50' adapted to intercalate with the pulling features 41. In the depicted embodiment, the balancing ring 50 defines a plurality of protrusions 51 extending radially outwardly, here along the outer periphery, though protrusions 51 could be along the inner periphery in other embodiments. The protrusions 51 may be referred to as tabs, teeth, crenellations, etc. The plurality of protrusions 51 are spaced apart circumferentially. A circumferential space 52 is defined between adjacent protrusions 51. In FIG. 4A, such circumferential space 52 is occupied by respective pulling features 41. The circumferential space 52 is adapted to accommodate the pulling features 41. As such, the pulling features 41 and the protrusions 51 may intercalate circumferentially.

Similar to that discussed above with respect to the pulling features 41, the balancing ring 50 may define an annular volume envelope, shown as V2 (see also on FIG. 5A, which will be discussed later). The annular volume envelope V2 corresponds to a volume occupied by the protrusions 51 and the circumferential spaces 52 of the balancing ring 50. As shown, the volume envelope V2 of the balancing ring 50 may define an annular band extending between an arc tangent to a base 51C of the protrusions 51 and an arc tangent to a radial extremity 51D of the protrusions 51. As such, it can be seen that portions of the balancing ring 50 penetrates the volume envelope V1 of the pulling features 41, and vice versa.

In some embodiments, the geometry of a pulling feature 41 may correspond to the shape of a circumferential space 52. In other words, their respective contour lines may have the same relief in some embodiments. The pulling features 41 may thus register or mate within the circumferential spaces 52. The geometry of the pulling features 41 may not correspond to the shape of the circumferential spaces 52 in other embodiments. Yet, the geometry of the pulling features 41 and/or protrusions 51 and/or the shape of a circumferential spaces 52 may be different from that shown. For instance, their respective contour lines may be curved or rounded, such as to define a wave profile.

The radial overlapping (or partial overlapping in some embodiments) of the volume envelopes V1, V2 of the pulling features 41 and the balancing ring 50 may allow more radial compactness, which may reduce the overall diameter of the outermost part, here being the annular body 40. Reducing the overall diameter of the outermost part may result in a radial space gain within a given volume envelope inside the aircraft engines. Such radial space gain may in turn be beneficial on weight savings and/or overall volume decrease of part subassembly 20'. In some instances, such radial space gain may allow creating more empty space, thereby increasing an engine internal volume that may be dedicated to cooling zones. In some instances, such radial space gain may allow having a balancing ring 50 with a greater diameter than that if pulling features 41 and intercalating configuration were absent.

Referring to FIG. 5 and the magnified view of FIG. 5A, an embodiment of the balancing ring 50 is shown in isolation. As shown, and previously discussed, the balancing ring 50 has protrusions 51 extending radially outwardly relative to the center of the balancing ring 50. The protrusions 51 have a top surface 51E extending between chamfered or sloped surfaces 51F. The top surface 51E may be flat such as to extend along a straight line, or, as shown, it may follow the curvature of the periphery 50' of the balancing ring 50 (or tangent line 51D). In other embodiments, the top surface 51E and/or sloped surfaces 51F may be curved or rounded, for instance to define an hemispherical shape, or have an irregular shape, such as an indented shape.

In some embodiments, at least one of the protrusions 51 may have a different shape than other ones. In the depicted embodiment, the balancing ring 50 includes three differently shaped protrusions 51, which are referred to as elements 53. As shown, in an embodiment, these differently shaped protrusions 53 are different in that their respective top surfaces 51E have a greater arc length AL than the other ones of the protrusions 51. In other embodiments, their arc length AL may be shorter than that of the other ones of the protrusions 51. As another possibility, these differently shaped protrusions 53 may be curved or rounded, whereas the other ones of the protrusions 51 may have the configuration shown in FIG. 5A. There may be other possibilities. Having these differently shaped protrusions 53 may define "assembly mistake proofing features" and/or "clocking feature". For instance, circumferential spaces 42 in the annular body 40 may be intendedly shaped differently to accommodate these differently shaped protrusions 53, hence requiring a predetermined position and/or orientation of the balancing ring 50 relative to the annular body 40 to allow mutual assembly. The differently shaped protrusion(s) 53 may be a clocking feature to allow a desired orientation to be reached and/or assembly mistake proofing feature to allow assembly of the balancing ring 50 in a single way. For instance, in some embodiments, the differently shaped protrusion(s) 53 may allow installation of the balancing ring 50 from one side or the other while still maintaining the desired clockwise orientation, whereas in other embodiments, the differently shaped protrusion(s) 53 may allow installation of the balancing ring 50 in a unique position relative to the annular body 40, i.e. one side and one desired clockwise orientation, as would be referred to as a "poke-yoke" device. The poke-yoke configuration may be implemented by having three or more unevenly distributed protrusions 51, or by having a single protrusion 51 asymmetrically shaped, for instance.

Counterweights may be coupled to the balancing ring 50 at desired locations along its circumference to balance/counterbalance a measured imbalance of the subassembly 20', for instance. Imbalance measurement methods will not be further described herein. Suffice it to say that imbalance of a rotor assembly 20 or part subassembly 20' may be experimentally or numerically determined. Counterweights may then be installed on the balancing ring 50 to compensate (at least partially) such imbalance. Coupling of counterweights, such as counterweight 60 shown in FIG. 2, onto the balancing ring 50 may be made in various ways. In the depicted embodiment, the balancing ring 50 includes holes 54 adapted to couple counterweights 60 to the balancing ring 50. For instance, counterweights 60 may be riveted or otherwise fastened to the balancing ring 50 via the holes 54. In the depicted embodiment, the balancing ring 50 includes at least one hole 54 per protrusions 51. There is two holes per differently shaped protrusions 53, and one hole per other ones of the protrusions 51 in this particular case. This could be different in other embodiments. The center axis of each hole 54 are located at a same radial distance from the center of the balancing ring 50, though this is only one possibility.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the balancing ring may be mounted radially outward relative to the annular bodies, such as the intercalated features discussed above may be inverted radially compared to that shown in the figures.

It is observed that the intercalating can be described as the smallest diameter defined jointly by the inward pulling features of the various embodiments that is smaller than the largest diameter defined jointly by the outward protrusions of the balancing ring. A reverse arrangement is also possible, namely the smallest diameter defined jointly by the inward protrusions of the balancing ring that is smaller than the largest diameter defined jointly by the outward pulling features.

The present disclosure may be applied to any annular parts concentrically mounted relative to each other. For instance, a first annular part and a second annular part may be concentric with each other, the first part having an outer periphery shape adapted to accommodate or intercalate with portions of the inner periphery of the second part, such that an outermost portion of the first part may penetrate in the volume envelope of the second part and/or vice versa. Yet further modifications could be implemented by a person of ordinary skill in the art in view of the present disclosure, which modifications would be within the scope of the present technology.

The invention claimed is:

1. A rotary parts assembly for an aircraft engine comprising:
   an annular body configured to be removably secured to a shaft of the aircraft engine, the annular body extending radially from the shaft, the annular body having a plurality of pulling features disposed circumferentially therealong;

wherein the pulling features are tabs extending radially inwardly, wherein the tabs each define a pulling face extending radially inwardly, the pulling face is configured to engage axially a pulling tool; and a balancing ring configured to be removably mounted to the shaft, the balancing ring being concentric with the annular body, the balancing ring having a periphery and portions along said periphery that intercalate with the plurality of pulling features, the pulling features received within circumferential spaces defined between the portions of the balancing ring.

2. The rotary parts assembly as defined in claim 1, wherein the periphery of the balancing ring is an outer periphery.

3. The rotary parts assembly as defined in claim 1, wherein at least one of the portions that intercalate with the plurality of pulling features has a different shape than the other ones of the portions.

4. The rotary parts assembly as defined in claim 1, wherein the portions along said periphery define a plurality of protrusions extending outwardly, and the circumferential spaces defined between adjacent ones of the protrusions are adapted to accommodate the pulling features.

5. The rotary parts assembly as defined in claim 4, wherein the circumferential spaces and the pulling features have a contour line having a corresponding relief.

6. The rotary parts assembly as defined in claim 1, wherein the portions along said periphery define a plurality of protrusions, the balancing ring having at least one hole per protrusion defined therethrough, the balancing ring having at least one counterweight removably secured thereto via riveting through one of said holes.

7. The rotary parts assembly as defined in claim 1, wherein an axial space is defined between the pulling face and an oppositely facing wall of the annular body.

8. The rotary parts assembly as defined in claim 1, wherein the balancing ring is mounted about the shaft via a spacer interfacing with the shaft and the balancing ring, the spacer concentric with the balancing ring.

9. The rotary parts assembly as defined in claim 1, wherein a radial distance between the tabs and the shaft radially underneath the tabs is from 20% to 90% of a radial foot print of the annular body.

10. The rotary parts assembly as defined in claim 9, wherein the radial distance is no more than 50%±10% of the radial foot print of the annular body.

11. The rotary parts assembly as defined in claim 1, wherein the annular body is one of a front runner or a rear runner of a seal runner assembly.

12. An assembly for mounting onto a shaft of an aircraft engine, the assembly comprising:

a balancing ring having a peripheral surface defining a plurality of adjacent protrusions along said peripheral surface, circumferential spaces defined between said protrusions, the balancing ring defining a first annular volume envelope corresponding to a volume of the protrusions and the circumferential spaces of the balancing ring;

an annular body extending radially from the shaft, the annular body having a portion radially aligned with the balancing ring, the annular body having a peripheral surface defining a plurality of adjacent tabs along said peripheral surface, circumferential spaces defined between said tabs, the annular body defining a second annular volume envelope corresponding to a volume of the tabs and the circumferential spaces of the annular body, the balancing ring and the annular body mounted relative to each other such that at least part of the first and second annular volume envelopes overlap and such that the protrusions of the balancing ring are received within the circumferential spaces of the annular body; and wherein the pulling features are tabs extending radially inwardly, wherein the tabs each define a pulling face extending radially inwardly, the pulling face is configured to engage axially a pulling tool.

13. The assembly as defined in claim 12, wherein all of the first and second annular volume envelopes overlap.

14. The assembly as defined in claim 12, wherein the peripheral surface of the balancing ring is an outer peripheral surface, the protrusions extending radially outwardly from a remainder of the peripheral surface.

15. The assembly as defined in claim 12, wherein at least one of the protrusions is shaped differently than at least some other ones of the protrusions.

16. The assembly as defined in claim 12, wherein the balancing ring has at least one hole per protrusion defined therethrough, the balancing ring having a counterweight removably secured thereto by fastening through one of said holes the counterweight.

17. The assembly as defined in claim 12, wherein the circumferential spaces of the balancing ring and the tabs have a corresponding shape.

18. The assembly as defined in claim 12, wherein the peripheral surface of the annular body is a radially inwardly facing surface, such that the tabs extend radially inwardly therefrom.

* * * * *